H. G. ANDERSON.
TRACTION DEVICE.
APPLICATION FILED FEB. 11, 1920.
1,378,083.
Patented May 17, 1921.
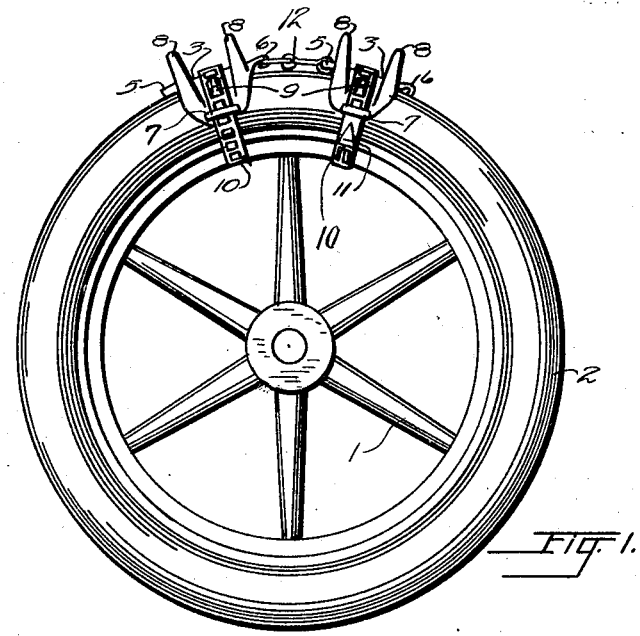
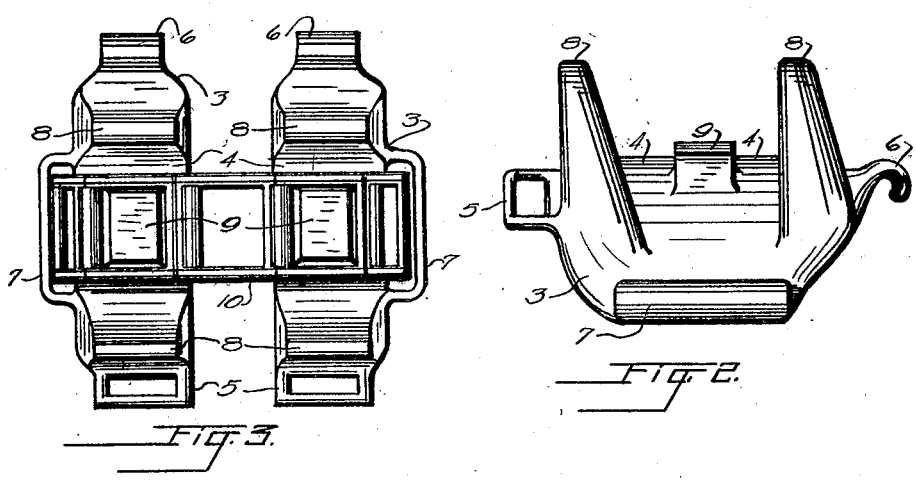

UNITED STATES PATENT OFFICE.

HARRY G. ANDERSON, OF CHICAGO, ILLINOIS.

TRACTION DEVICE.

1,378,083. Specification of Letters Patent. Patented May 17, 1921.

Application filed February 11, 1920. Serial No. 357,800.

*To all whom it may concern:*

Be it known that I, HARRY G. ANDERSON, a citizen of the United States, residing at Chicago, in the county of Cook and State of Illinois, have invented certain new and useful Improvements in Traction Devices, of which the following is a specification.

This invention relates to improvements in traction devices and more particularly to devices of that class adapted for application to vehicle wheels to prevent skidding, to facilitate the operation of extricating the vehicle from ruts and holes or the like in soft earth; and for driving over muddy or sandy roads or the like. I provide a plurality of shoes adapted to be adjustably secured in pairs about the periphery of the wheel, the several pairs of shoes being connected by chain links or the like. With the foregoing and other objects in view the invention consists in the combination and arrangement of parts to be hereinafter fully described, pointed out in the appended claims and illustrated in the accompanying drawing which forms a part of this specification and in which—

Figure 1 is a view of a wheel, in side elevation, illustrating the application of my device.

Fig. 2 is a view of one shoe.

Fig. 3 is a top plan view of the device turned at right angles to the position shown in Fig. 1 to afford a better illustration.

Like reference characters denote corresponding parts throughout the several views.

The reference numeral 1 denotes a vehicle wheel provided with the pneumatic tire 2. I provide a shoe comprising a metallic plate 3 shaped to conform to the periphery of an inflated pneumatic tire. Each plate comprises the body portion 4 which sits upon the tire between the tread and base or partly disposed upon the tread. The shoes in operative position extend longitudinally of the tire and are arranged in pairs, the members of each pair being spaced away from each other so that the main part of the tread portion of the tire is visible between the members of a pair of shoes. The body portion of each plate 4 is formed with a perforated ear 5 at one end, with a hook 6 at its opposite end and with an enlarged perforated ear 7 at one side. Upstanding lugs 8 are formed upon the body portion of the plate adjacent the hook 6 and ear 5 and between said lugs a tooth 9 is formed upon the body portion of the plate. The members of each pair of shoes are adjustably connected together by a sprocket chain 10, the links of which are adapted to engage with the teeth 9 to retain the shoes in their relative positions upon the tire. The links of the chain 10 pass through the elongated ears 7 and about the wheel rim, one end of the chain carrying a hook adapted to engage with any link to secure the chain in adjusted position. In one form of chain that may be used a hook 11 may be formed upon the chain adapted to receive the terminal link, or other link of the chain, to retain it in adjusted position.

In Fig. 1 the two views of chain 10 are reversed with relation to each other, one view of the chain showing its ends fastened together and the other showing the intermediate portion of the chain.

Two or more pairs of shoes may be arranged upon the wheel and the successive pairs secured together by chains 12 that connect the hooks of one shoe with the ears 5 of the next shoe, two chains being required to secure one pair of shoes to the adjacent pair. In use, two or more pairs of shoes will serve to provide sufficient traction to get the vehicle out of an ordinary rut.

What is claimed is:—

1. In a traction device for vehicle wheels, a pair of shoes, each shoe comprising a curved plate terminating at one end in a hook and at its opposite end in an ear, each plate being formed also with an enlarged lateral ear, the lateral ear of one plate being disposed upon its side remote from the other plate, spaced upstanding lugs formed upon each plate, a tooth struck from each plate between its lugs, and a sprocket chain adapted for engagement with the teeth of each pair of shoes to adjustably secure the same together and to the vehicle wheel.

2. In a traction device for vehicle wheels, a pair of shoes, each shoe comprising a curved plate terminating at one end in a hook and at its opposite end in an ear, each plate being formed also with an enlarged lateral ear, upstanding lugs formed upon each plate, a tooth struck from each plate between its lugs, a sprocket chain adapted for engagement with the teeth of each pair of shoes to adjustably secure the same together and to the vehicle wheel, and means for releasably securing pairs of shoes together upon the wheel.

In testimony that I claim the foregoing as my own I have hereto affixed my signature.

HARRY G. ANDERSON.